US011267498B2

(12) United States Patent
Tolson et al.

(10) Patent No.: US 11,267,498 B2
(45) Date of Patent: Mar. 8, 2022

(54) ECOMMERCE PICKING AND PACKAGING CART

(71) Applicant: Walmart Apollo, LLC, Bentonville, AR (US)

(72) Inventors: Andrew Tolson, Cave Springs, AR (US); Abe Phillips, Cave Springs, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 187 days.

(21) Appl. No.: 16/684,636

(22) Filed: Nov. 15, 2019

(65) Prior Publication Data

US 2020/0172138 A1 Jun. 4, 2020

Related U.S. Application Data

(60) Provisional application No. 62/774,434, filed on Dec. 3, 2018.

(51) Int. Cl.
*B62B 3/10* (2006.01)
*B62B 3/00* (2006.01)
*G01G 23/37* (2006.01)
*B62B 5/04* (2006.01)
*G01G 19/52* (2006.01)
*B62B 5/06* (2006.01)

(52) U.S. Cl.
CPC .............. *B62B 3/104* (2013.01); *B62B 3/001* (2013.01); *B62B 3/106* (2013.01); *B62B 5/0433* (2013.01); *B62B 5/06* (2013.01); *G01G 19/52* (2013.01); *G01G 23/3728* (2013.01)

(58) Field of Classification Search
CPC ......... B62B 3/104; B62B 3/106; B62B 3/001; B62B 3/10; B62B 3/005; B62B 5/0433; B62B 5/06; B62B 2202/12; G01G 23/3728; G01G 23/3735; G01G 19/52; G01G 19/005
See application file for complete search history.

(56) References Cited

U.S. PATENT DOCUMENTS 5,544,468 A 8/1996 Harrison et al.
5,646,616 A 7/1997 Komatsu
(Continued)

OTHER PUBLICATIONS

Copenheaver, Blaine R., "International Search Report", International Application No. PCT/US2019/061586, dated Jan. 17, 2020, 2 pages.
(Continued)

*Primary Examiner* — James A Shriver, II
*Assistant Examiner* — Ian Bryce Shelton

(57) ABSTRACT

Various configurations of picking and packaging carts are disclosed that can be advantageously employed in Ecommerce and retail settings to improve operational efficiency. Examples can preclude the need for a detour from the item retrieval location to a packaging area, prior to delivery to a shipping area, such as a drop-off point. Some examples include a frame; a shelf rack; accessory support units including a printer holder; multiple shipping container support units configured to hold a plurality of shipping containers of a plurality of sizes; and a packaging shelf arrangement comprising a top shelf providing a flat packaging surface.

20 Claims, 7 Drawing Sheets

(56) References Cited

U.S. PATENT DOCUMENTS

| | | | |
|---|---|---|---|
| 5,971,512 A * | 10/1999 | Swan | B25H 1/10 |
| | | | 211/131.1 |
| 7,775,431 B2 | 8/2010 | Skaaksrud et al. | |
| 9,896,117 B1 * | 2/2018 | Wong | B25H 1/04 |
| 9,925,998 B2 | 3/2018 | Ackerman et al. | |
| 10,239,547 B1 * | 3/2019 | Mohan | B62B 3/008 |
| 10,787,187 B1 * | 9/2020 | De Bonet | B62B 5/0096 |
| 2001/0034656 A1 | 10/2001 | Lucas et al. | |
| 2001/0034665 A1 | 10/2001 | Kinory et al. | |
| 2003/0155731 A1 | 8/2003 | Ditges et al. | |
| 2005/0149373 A1 | 7/2005 | Amling et al. | |
| 2007/0182114 A1 * | 8/2007 | Fernandes | B25H 3/06 |
| | | | 280/47.35 |
| 2010/0057245 A1 | 3/2010 | Hironaka et al. | |
| 2013/0173049 A1 | 7/2013 | Brunner et al. | |
| 2014/0222711 A1 | 8/2014 | Tibbs et al. | |
| 2015/0206121 A1 * | 7/2015 | Joseph | B62B 3/1496 |
| | | | 705/23 |
| 2016/0009306 A1 * | 1/2016 | Garcia | B62B 5/0013 |
| | | | 280/47.35 |
| 2016/0176637 A1 | 6/2016 | Ackerman et al. | |
| 2019/0111956 A1 * | 4/2019 | Phillips | B62B 3/10 |

OTHER PUBLICATIONS

Copenheaver, Blaine R., "International Search Report", International Application No. PCT/US2019/061586, dated Jan. 17, 2020, 11 pages.

Global Equipment Company Inc., "Heavy Duty Mobile Packaging Work Bench", Jul. 21, 2017, retrieved from internet Dec. 23, 2019, https://web.archive.org/web/20170721231634/http://www.globalindustrial.com/g/work-benches/packaging-workstations/mobile/mobile-packaging-work-bench, 3 pages.

Treston Inc., "Erogonmic Packing Solutions", Oct. 2016, retrieved from internet Dec. 23, 2019, https://www.treston.us/serve/packing-catalog, 20 pages.

* cited by examiner

ECOMMERCE PICKING AND PACKAGING CART

BACKGROUND

When customers purchase items for shipment, such as for gifts, some retail facilities provide a shipping service. However, the items require packaging for shipment. Therefore, some retail facilities further offer a packaging service or station. In practice, the items are retrieved from retail shelves, transported to a packing station, packed, and then transported to the shipping carrier's specified drop-off point. A shipping drop-off point may be, for example, a FedEx or UPS drop box, or a US Postal Service (USPS) contract postal unit. A process that results in the items being transported to a packaging area, which may not be conveniently-located, may often be less efficient than is desirable.

SUMMARY

Various configurations of picking and packaging carts are disclosed that can be advantageously employed in E-commerce and retail settings to improve operational efficiency. Examples can preclude the need for a detour from the item retrieval location to a packaging area, prior to delivery to a shipping area, such as a drop-off point. Some examples include a frame; a shelf rack; accessory support units including a printer holder; multiple shipping container support units configured to hold a plurality of shipping containers of a plurality of sizes; and a packaging shelf arrangement comprising a top shelf providing a flat packaging surface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
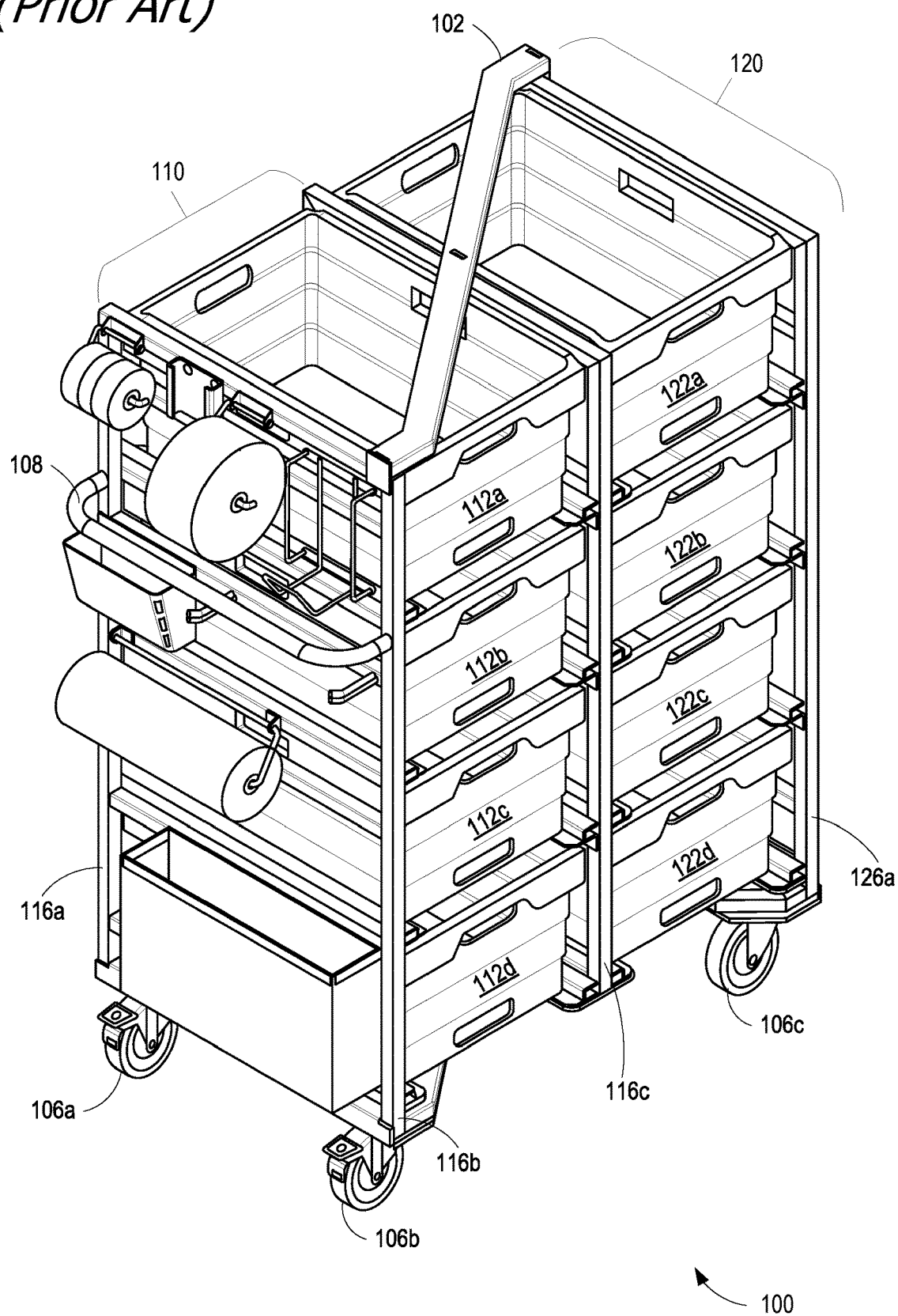
FIG. 1 illustrates a prior art pick cart.

A more detailed understanding may be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least some embodiments, . . . " For brevity and clarity of presentation, this implied leading clause is not repeated ad nauseum.

When customers purchase items for shipment, such as for gifts, some retail facilities provide a shipping service. However, the items require packaging for shipment. Therefore, some retail facilities further offer a packaging service or station. In practice, the items are retrieved from retail shelves, transported to a packing station, packed, and then transported to the shipping carrier's specified drop-off point. Such processes may often be less efficient than is achievable. For example, the item needs to be transported to a packaging area, and then a shipping area. Because counter space is at a premium in many retail locations the packaging area may not be conveniently or centrally located. Thus, time is wasted during transit that could be used more productively, if the trip to the packaging area could be avoided.

Various configurations of picking and packaging carts are disclosed that can be advantageously employed in E-commerce and retail settings to improve operational efficiency. Examples can preclude the need for a detour from the item retrieval location to a packaging area, prior to delivery to a shipping area, such as a drop-off point. Some examples include a frame; a shelf rack; accessory support units including a printer holder; multiple shipping container support units configured to hold a plurality of shipping containers of a plurality of sizes; and a packaging shelf arrangement comprising a top shelf providing a flat packaging surface.

Examples of the disclosed picking and packaging carts may be used by workers in a retail facility or ecommerce fulfillment location, for example to retrieve and package items for courier pickup. In some situations, the packaged items may be shipped via FedEx, UPS, or US Postal Service (USPS), and may thus require transport to a drop box or a USPS contract postal unit location. Because the example picking and packaging carts comprise mobile packing stations, they preclude the need for a trip to a packaging area—and may further reduce the need for a facility to have a packaging area or a large local storage area for items awaiting packaging. Thus, examples of picking and packaging carts may improve operational efficiency by freeing up floor space for additional inventory or other operational needs.

To better illustrate the advantages of novel picking and packaging cart 300 (of FIGS. 3-8), FIG. 1 illustrates a prior art pick cart 100. Prior art pick cart 100 has two fixed-position shelf racks 110 and 120, along with a brace 102 that connects the top of shelf rack 110 with the top of shelf rack 120. Mobility of prior art pick cart 100 is enabled by wheels 106a, 106b, 106c, and a fourth wheel that is obscured in the perspective shown in FIG. 1. A handle 108 enables a user to maneuver prior art pick cart 100. Handle 108 is illustrated as being attached to vertical members 116a and 116b of shelf rack 110. Disposed opposite vertical members 116a and 116b are a vertical member 126a, and another vertical member that is obscured and disposed atop the obscured fourth wheel of prior art pick cart 100. A vertical member 116c is shared by shelf rack 110 and shelf rack 120. To hold items that may otherwise roll or slide off prior art pick cart 100, bins 112a, 112b, 112c, and 112d are located within shelf rack 110, and bins 122a, 122b, 122c, and 122d are located within shelf rack 120. Prior art pick cart 100 also has various attachment points for accessories, as shown.

Figure 2A:
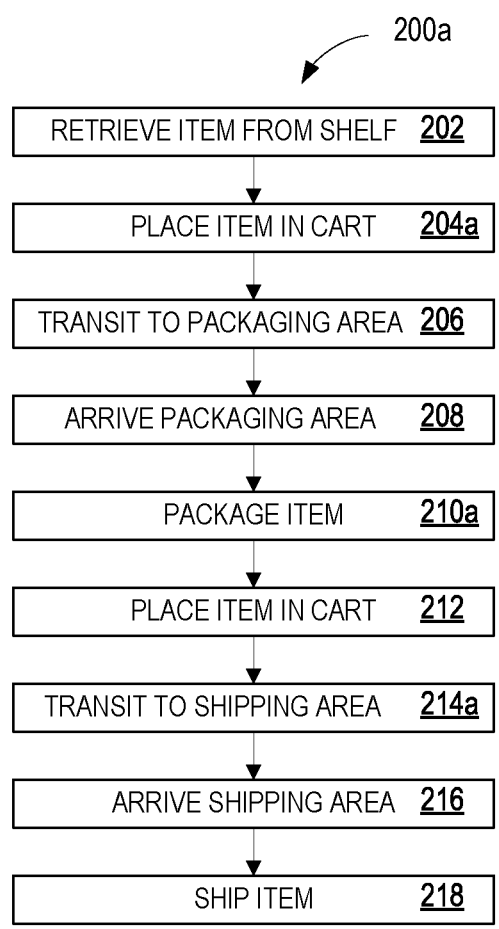
FIG. 2A illustrates a flow diagram of operations associated with using the prior art pick cart of FIG. 1.
Figure 2B:
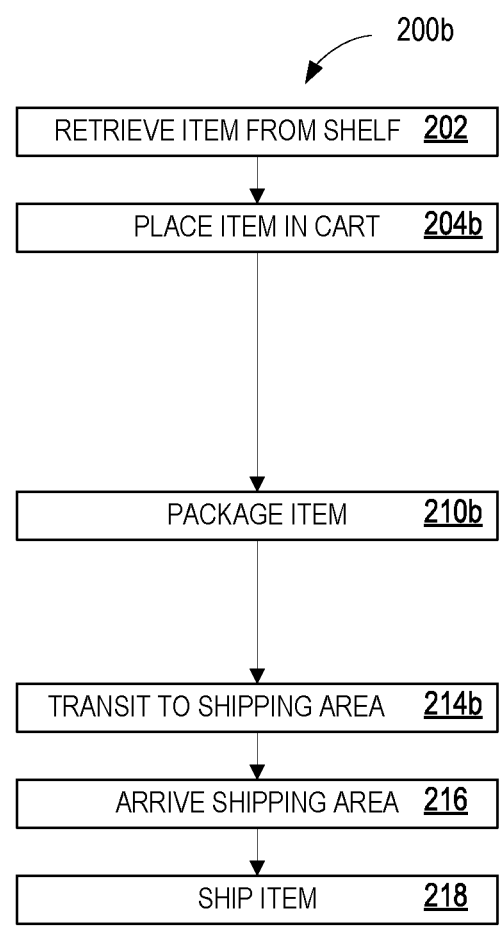
FIG. 2B illustrates a flow diagram of operations associated with using the picking and packaging cart of FIG. 3, showing efficiency gains over the flow chart of FIG. 2A.
Figure 3:
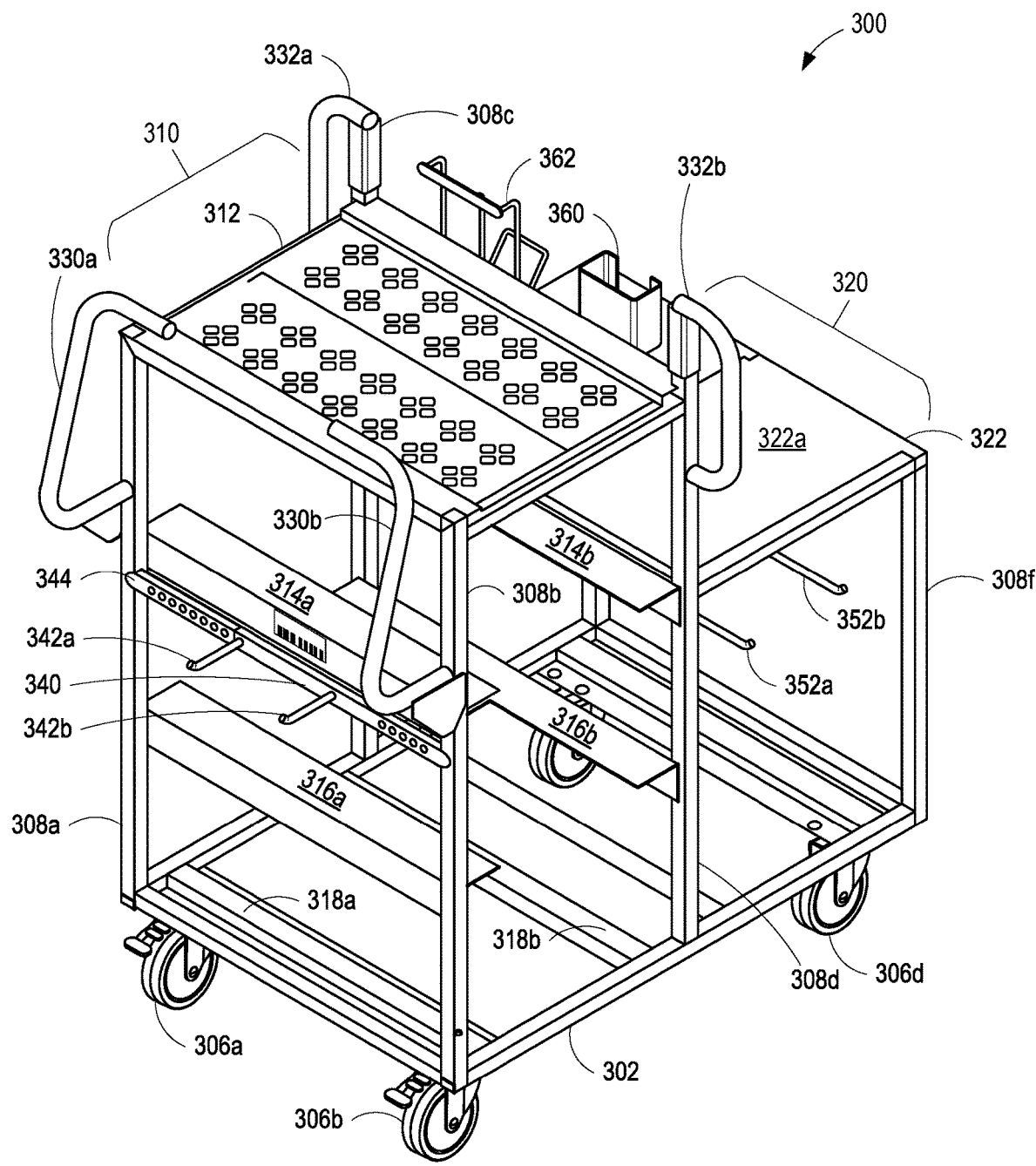
FIG. 3 illustrates a perspective view of an example picking and packaging cart.

FIG. 2A illustrates a flow diagram 200a of operations associated with using prior art pick cart 100 (of FIG. 1), and FIG. 2B illustrates a flow diagram 200b of operations associated with using a picking and packaging cart 300 (shown in FIG. 3). FIGS. 2A and 2B should be viewed together, to appreciate efficiency gains enabled by picking and packaging cart 300. Referencing first FIG. 2A, an item is retrieved from a retail shelf location in operation 202, and placed within a cart (e.g., prior art pick cart 100) in operation 204a. The cart, carrying the item (or items), is then in transit to a packaging area, in operation 206, and arrives, at operation 208. The item is then packaged in operation 210a and the packaged item is then returned to the cart, or placed in another cart, in operation 212. The cart, carrying the packaged item, is then in transit to a shipping area, in operation 214a, and arrives, at operation 216. The packaged item is then shipped in operation 218.

Referencing now FIG. 2B, an item is retrieved from a retail shelf location in operation 202, and placed picking and packaging cart 300 in operation 204b. The item is then packaged in operation 210b, leveraging features of picking and packaging cart 300 described further in relation to FIGS. 3-7. Picking and packaging cart 300, carrying the packaged item, is then in transit to a shipping area, in operation 214b, and arrives, at operation 216. The packaged item is then shipped in operation 218. Operations 206, 208, and 212 are rendered unnecessary, providing improved efficiency. It should be noted that operations 210b and 214b may occur in reverse order, or operation 214b may span operation 210b.

Figure 4:
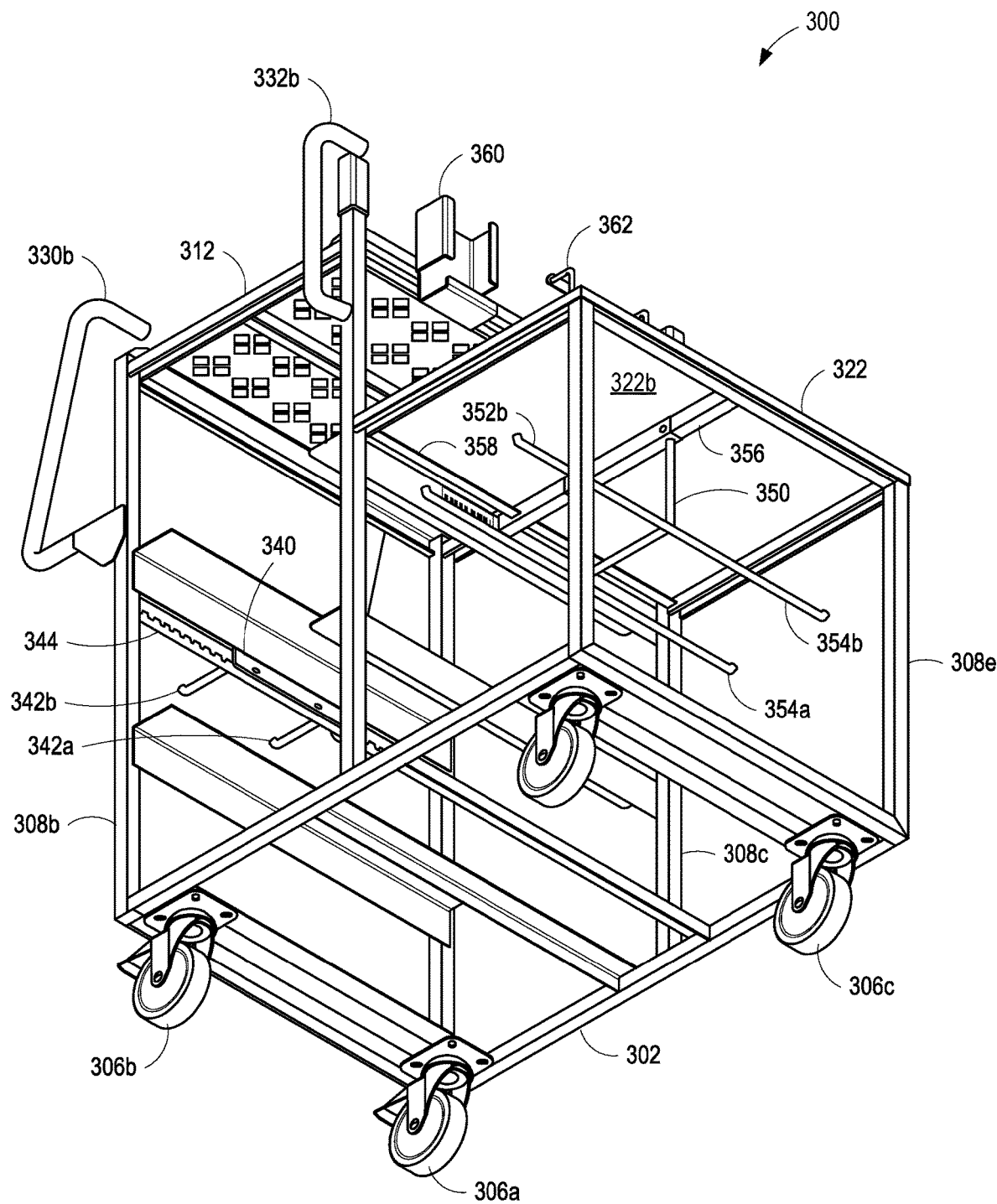
FIG. 4 illustrates a different perspective view of the picking and packaging cart of FIG. 3.

FIG. 3 illustrates a perspective view of exemplary picking and packaging cart 300, and FIG. 4 illustrates a different perspective view of picking and packaging cart 300. Specifically, FIG. 3 provides a view from above picking and packaging cart 300, whereas FIG. 4 provides a view from beneath picking and packaging cart 300. FIGS. 3 and 4 may be viewed together. As described below, picking and packaging cart 300 includes provisions for packaging items for shipment, on board. Further, picking and packaging cart 300 enables packing of picked items into courier packaging and labelling to complete the packaging for the courier pickup from picking and packaging cart 300 or deposit in a drop box without a detour to a packaging area.

Picking and packaging cart 300 has a frame 302 that is optionally made of aluminum; a shelf rack 310 is attached to frame 302. Shelf rack 310 has two pairs of vertical members; the first pair is vertical member 308a and vertical member 308b, and the second pair is vertical member 308c and vertical member 308d. Shelf rack 310 also has a top shelf 312 providing a flat surface. In some examples, top shelf 312 of shelf rack 310 is perforated, which provides weight savings for picking and packaging cart 300. As illustrated, there are three vertical shelf divisions, 314, 316, and 318 (see FIG. 5), disposed below top shelf 312 of shelf rack 310, which may each hold a bin, such as one of bins 112a-122d (of FIG. 1). The three vertical shelf divisions have shelf segments 314a and 314b, for an uppermost shelf division 314; shelf segments 316a and 316b, for a middle shelf division 316; and shelf segments 318a and 318b, for a bottom shelf division 318. See FIG. 5 for the labeling of the shelf divisions. Although separate shelf divisions are illustrated, each shelf division acting as a rail to support a bin, some examples of picking and packaging cart 300 may have continuous shelves that span the width of shelf rack 310, such that, for example, shelf segments 314a and 314b are a single surface. Bins in shelf rack 310 can hold packaging materials and accessories, such as labels, containers, scanners, printers, unpackaged items, and also packaged items.

A first handle (handle portion 330a and handle portion 330b) is attached to frame 302, via vertical member 308a and vertical member 308b. The first handle has two separate mirrored portions, handle portion 330a and handle portion 330b. In this illustrated example of picking and packaging cart 300, handle portion 330a and handle portion 330b are each curved in at least two dimensions, to form a bullhorn-style handle. Two accessory support units, accessory support unit 360 and accessory support unit 362, are attached to shelf rack 310. Accessory support units 360 and 362 are in different configurations. For example, accessory support unit 360 is configured to hold a handheld scanner, whereas accessory support unit 362 is a printer holder. Accessory support unit 362 can hold a printer that can print product labels and shipping labels, in order to facilitate the use of picking and packaging cart 300 in roles as either a product picking cart or a packaging (for shipping) cart.

A first shipping container support unit 340 is attached to shelf rack 310, and is configured to hold a plurality of shipping containers of a first size. Shipping container support unit 340 includes a pair of bag hooks 342a and 342b, although a different configuration may be used in some examples. In some examples, bag hooks 342a and 342b are approximately 4 inches (4") long, with an upturn of approximately one-half inch (½") so that shipping containers hung on bag hooks 342a and 342b do not fall off. In some examples, bag hooks 342a and 342b are separated by approximately 12 inches (12"). Exemplary shipping container support unit 340 is repositionable laterally, at various locations along a notched and perforated support rail 344. Four wheels, 306a, 306b, 306c, and 306d, are attached to frame 302, and each of wheels 306a-306d is disposed nearby a corner of frame 302. In some examples, at least two of wheels 306a-306d are swivel casters. In some examples, all of wheels 306a-306d are swivel casters. In some examples, all of wheels 306a-306d are swivel casters, and there is another set of non-steerable wheels with one located between wheels 306a and 306c, and another located between wheels 306b and 306d, which permits rapid rotation. In some examples, at least two of the swivel casters are lockable to prevent swiveling.

A packaging shelf arrangement 320 is attached to frame 302. Packaging shelf arrangement 320 has at least two pairs of vertical members; the first pair is vertical member 308e and vertical member 308f, and the second pair is vertical member 308c and vertical member 308d. The pair of vertical members 308c and 308d is shared by shelf rack 310 and packaging shelf arrangement 320. Packaging shelf arrangement 320 also has a top shelf 322 providing a flat packaging surface, and having an upper side 322a and a lower side 322b. In some examples, top shelf 322 of packaging shelf arrangement 320 is not perforated, even when top shelf 312 of shelf rack 310 is perforated for weight savings. This is because top shelf 322 of packaging shelf arrangement 320 is intended for use in packaging items, and perforations may allow small items to fall through, whereas top shelf 312 of shelf rack 310 is more likely to be used for carrying larger items that will not fall through the perforations.

A second shipping container support unit 350 is attached to packaging shelf arrangement 320. Shipping container support unit 350 is configured to hold a plurality of shipping containers, and is disposed beneath top shelf 322 of packaging shelf arrangement 320, specifically, below lower side 322b of top shelf 322. In some examples, shipping container support unit 350 comprises two pairs of bag hooks; the first pair is bag hook 352a and bag hook 352b, and the second pair is bag hook 354a and bag hook 354b. In some examples, bag hooks 352a, 352b, 354a, and 354b are approximately six inches (6"), long, with an upturn of approximately one-half inch (½") so that shipping containers hung on bag hooks 342a and 342b do not fall off. In some examples, bag hooks 352a, 352b, 354a, and 354b are separated by approximately 12 inches (12"), although in some examples, bag hooks 352a, 352b, 354a, and 354b have different separation widths, for example when shipping containers of different sizes are outfitted with hanging hooks with different separations, so that workers may easily recognize where different shipping containers should be provisioned on picking and packaging cart 300.

In some examples, bag hooks 352a, 352b, 354a, and 354b are positioned approximately six inches beneath lower side 322b of top shelf 322 (of packaging shelf arrangement 320). Thus, bag hooks 352a, 352b, 354a, and 354b of shipping container support unit 350 are positioned at a lower height than bag hooks 342a and 342b of shipping container support unit 340. This height difference permits shipping container support unit 340 to carry taller (in the hanging orientation) shipping containers than shipping container support unit 350 can carry. Thus, shipping container support unit 350 is configured to hold a plurality of shipping containers of a second size different than the first size that shipping container support unit 340 is configured to hold. If bag hooks 352a, 352b, 354a, and 354b have different separation widths or are positioned at different heights beneath lower side 322b of top shelf 322 (of packaging shelf arrangement 320), then shipping container support unit 3502 is further configured to hold a plurality of shipping containers of a third size different than the first size and the second size.

Figure 8:
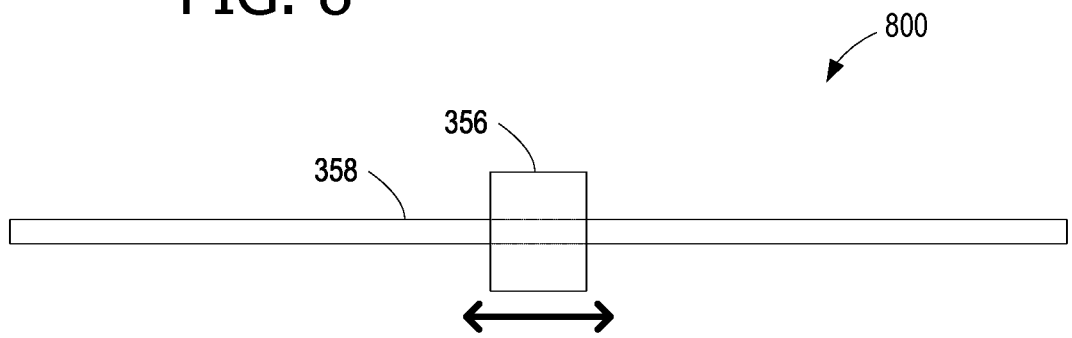
FIG. 8 illustrates a close-up view of a portion of the picking and packaging cart of FIG. 3.

In some examples, as further explained in relation to FIG. 8, shipping container support unit 350 is repositionable by sliding. As illustrated, shipping container support unit 350 is suspended from a frame member 356 that is further suspended by a rail 358. Another rail, equivalent to rail 358, is obscured from view. A pair of secondary handles, handle 332a and 332b, are each disposed on one of 308c and 308d. Secondary handles 332a and 332b permit additional maneuverability for picking and packaging cart 300. As illustrated, secondary handles 332a and 332b are each curved in at least one dimension, and may form a D or J-shape.

Figure 5:
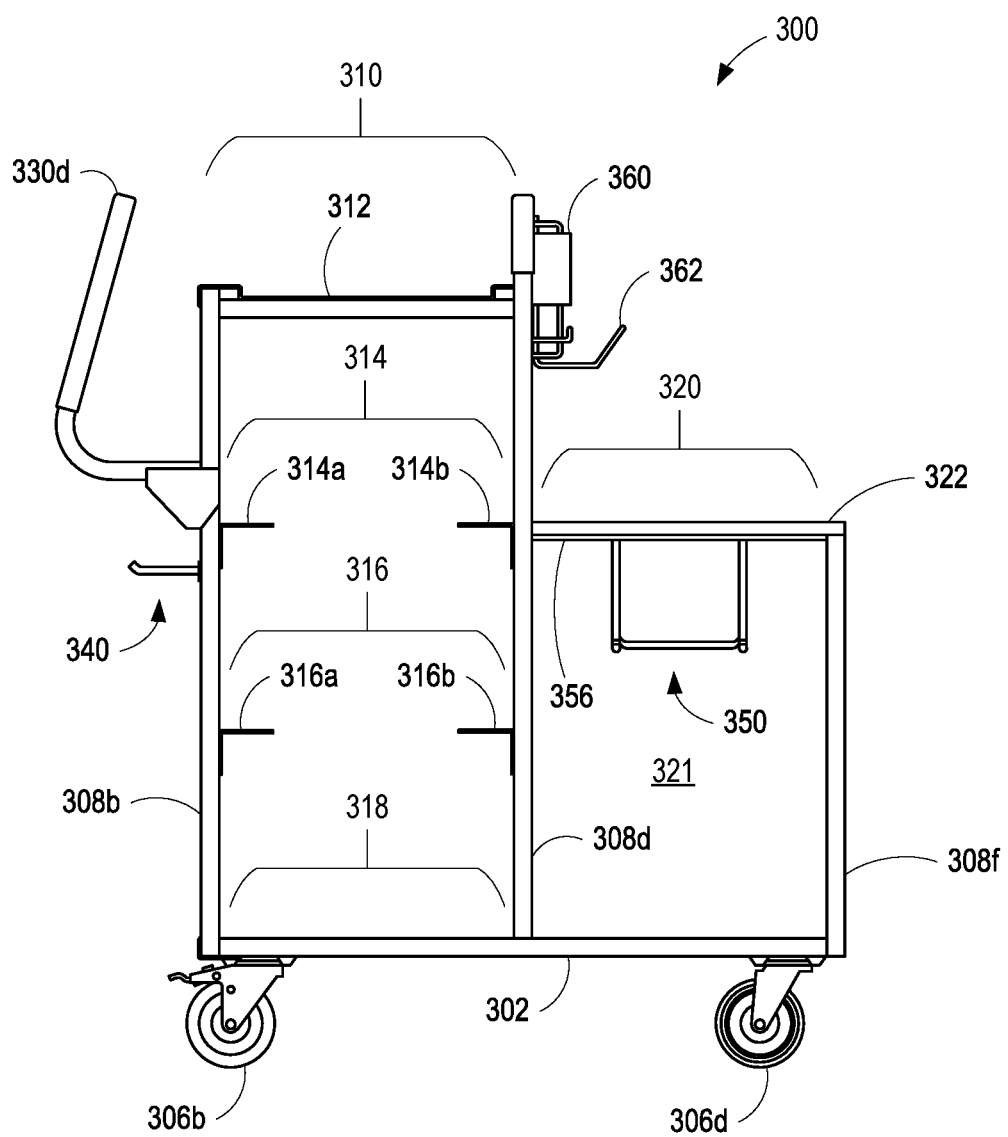
FIG. 5 illustrates a side view of the picking and packaging cart of FIG. 3.

FIG. 5 illustrates a side view of picking and packaging cart 300. In this view, shelf segments 318a and 318b of bottom shelf division 318 are obscured from view by frame 302. Handle portion 330d is visible, and is described in further detail in relation to FIG. 7. As can be seen in FIG. 5, a shipping container storage volume 321, is formed beneath top shelf 322 of packaging shelf arrangement 320, and above frame 302. It is the height of shipping container storage volume 321 (between shipping container support unit 350 and frame 302) that limits the height (in the hanging orientation) of shipping containers held by shipping container support unit 350.

Figure 6:
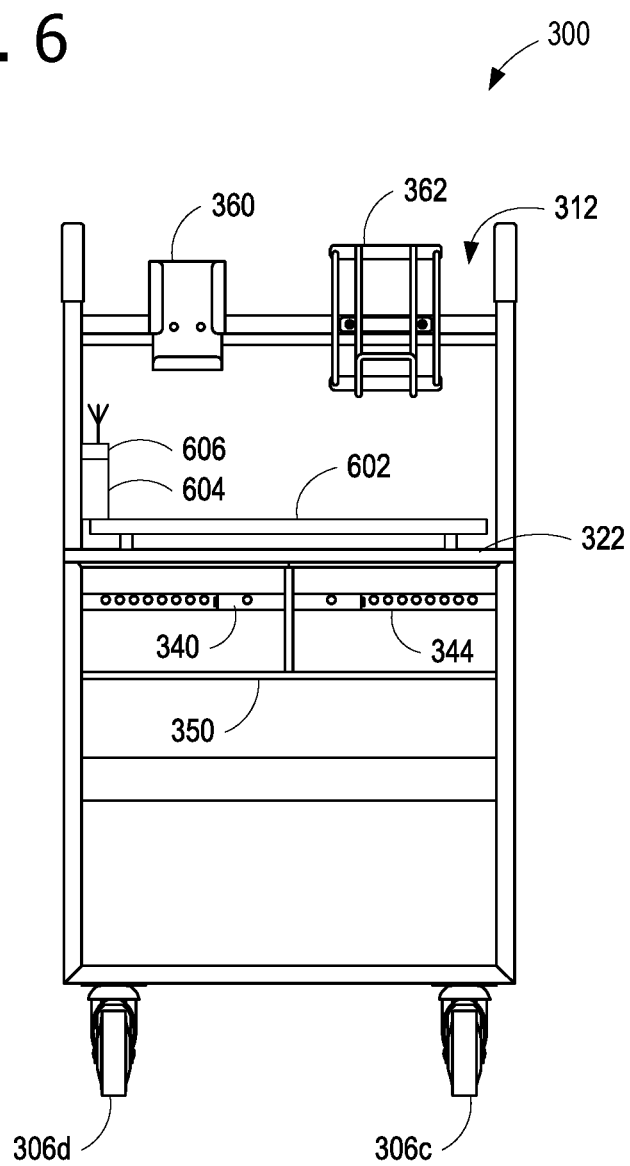
FIG. 6 illustrates a frontal view of the picking and packaging cart of FIG. 3.

FIG. 6 illustrates a frontal view of picking and packaging cart 300. A weight scale 602 permits weighing packaged items, in order to calculate required postage. This further enhances the efficiency of picking and packaging cart 300. Weight scale 602 may be an electronic scale, and is thus coupled to a power supply 604 to receive power. Some examples of picking and packaging cart 300 include power supply 604 as an integrated component. Power supply 604 may have a replaceable or rechargeable battery. Weight scale 602 is also coupled to a wireless communication module 606, which uses Bluetooth™ or another protocol, to wirelessly communicate with other devices involved with packaging items for shipping (e.g., a printer or scanner held by one of accessory support units 360 and 362. In some examples, top shelf 322 of packaging shelf arrangement 320 is configured to hold weight scale 602. In some examples, weight scale 602 is integrated into top shelf 322 of packaging shelf arrangement 320.

Figure 7:
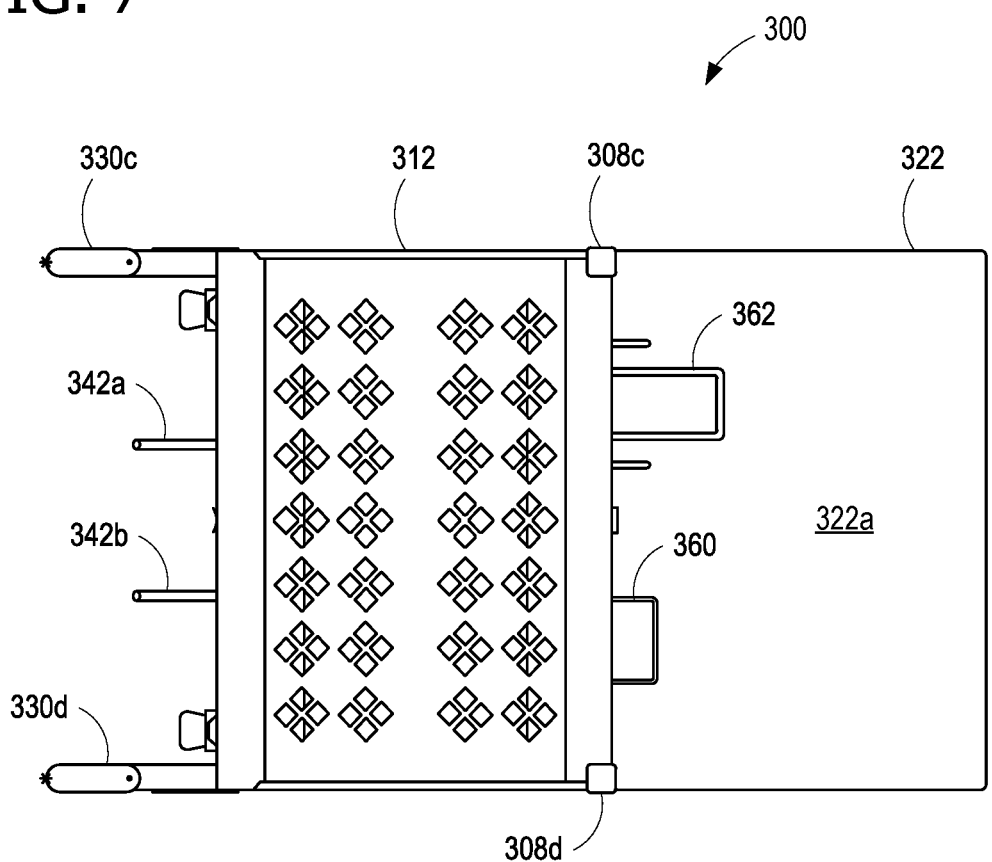
FIG. 7 illustrates a top view of the picking and packaging cart of FIG. 3.

FIG. 7 illustrates a top view of picking and packaging cart 300. The perforations of top shelf 312 are visible in this view. In this illustrated example of picking and packaging cart 300 first handle (handle portion 330c and handle portion 330d) has two separate mirrored portions, handle portion 330a and handle portion 330b. However, in this illustrated example, handle portions 330c and 330d are not curved in a second dimension, and thus are not bullhorn-style handle portions.

FIG. 8 illustrates a close-up view of a portion of picking and packaging cart 300. Specifically, FIG. 8 illustrates sliding arrangement 800 that permits shipping container support unit 350 to be repositionable by sliding. Frame member 356 is illustrated from a side view, with rail 358 passing through frame member 356. Frame member 356 may thus traverse along rail 358, by sliding as indicated by the opposing arrows, thereby repositioning shipping container support unit 350.

Exemplary Systems

An exemplary picking and packaging cart comprises: a frame; a shelf rack attached to the frame, the shelf rack comprising at least two pairs of vertical members and a plurality of shelf divisions; a first handle attached to the frame; at least two accessory support units attached to the shelf rack, the two accessory support units having at least two different configurations; a first shipping container support unit attached to the shelf rack, the first shipping container support unit configured to hold a plurality of shipping containers of a first size; at least four wheels attached to the frame, each of the at least four wheels disposed nearby a corner of the frame, wherein at least two wheels of the at least four wheels comprise swivel casters; a packaging shelf arrangement attached to the frame, the packaging shelf arrangement having at least two pairs of vertical members and a top shelf, wherein at least one pair of the vertical members of the packaging shelf arrangement are shared with the shelf rack, and wherein the top shelf of the packaging shelf arrangement provides a flat packaging surface; and a second shipping container support unit attached to the packaging shelf arrangement.

Another exemplary picking and packaging cart comprises: a frame comprised of aluminum; a shelf rack attached to the frame, the shelf rack comprising: at least two pairs of vertical members, a top shelf providing a flat surface, and at least three vertical shelf divisions disposed below the top shelf of the shelf rack; a first handle attached to the frame, wherein the first handle comprises two separate mirrored portions, and wherein the first handle is curved in at least two dimensions; at least two accessory support units attached to the shelf rack, the two accessory support units having at least two different configurations, wherein at least one of the accessory support units comprises a printer holder; a first shipping container support unit attached to the shelf rack, the first shipping container support unit configured to hold a plurality of shipping containers of a first size, wherein the first shipping container support unit comprises a pair of bag hooks; at least four wheels attached to the frame, each of the at least four wheels disposed nearby a corner of the frame, wherein at least two wheels of the at least four wheels comprise swivel casters; a packaging shelf arrangement attached to the frame, the packaging shelf arrangement having at least two pairs of vertical members and a top shelf, wherein at least one pair of the vertical members of the packaging shelf arrangement are shared with the shelf rack, and wherein the top shelf of the packaging shelf arrangement provides a flat packaging surface; a second shipping container support unit attached to the packaging shelf arrangement, wherein the second shipping container support unit is disposed beneath the top shelf of the packaging shelf arrangement, wherein the second shipping container support unit is repositionable by sliding, wherein the second shipping container support unit comprises two pairs of bag hooks, and wherein the second shipping container support unit is configured to hold a plurality of shipping containers of a second size different than the first size; and a pair of secondary handles, each of the secondary handles disposed on one of the shared vertical members, wherein each of the secondary handles is curved in at least one dimension.

Another exemplary picking and packaging cart comprises: a frame comprised of aluminum; a shelf rack attached to the frame, the shelf rack comprising: at least two pairs of vertical members, a top shelf providing a flat surface, wherein the top shelf of the shelf rack is perforated, and at least three vertical shelf divisions disposed below the top shelf of the shelf rack; a first handle attached to the frame, wherein the first handle comprises two separate mirrored portions, and wherein the first handle is curved in at least two dimensions; at least two accessory support units attached to the shelf rack, the two accessory support units having at least two different configurations, wherein at least one of the accessory support units comprises a printer holder; a first shipping container support unit attached to the shelf rack, the first shipping container support unit configured to hold a plurality of shipping containers of a first size, wherein the first shipping container support unit comprises a pair of bag hooks, and wherein the first shipping container support unit is repositionable; at least four wheels attached to the frame, each of the at least four wheels disposed nearby a corner of the frame, wherein at least four wheels comprise swivel casters, and wherein at least two of the swivel casters are lockable to prevent swiveling; a packaging shelf arrangement attached to the frame, the packaging shelf arrangement having at least two pairs of vertical members and a top shelf, wherein at least one pair of the vertical members of the packaging shelf arrangement are shared with the shelf rack, and wherein the top shelf of the packaging shelf arrangement provides a flat packaging surface; a second shipping container support unit attached to the packaging shelf arrangement, wherein the second shipping container support unit is disposed beneath the top shelf of the packaging shelf arrangement, wherein the second shipping container support unit is repositionable by sliding, wherein the second shipping container support unit comprises two pairs of bag hooks, wherein the second shipping container support unit is configured to hold a plurality of shipping containers of a second size different than the first size, wherein the second shipping container support unit is further configured to hold a plurality of shipping containers of a third size different than the first size and the second size; a pair of secondary handles, each of the secondary handles disposed on one of the shared vertical members, wherein each of the secondary handles is curved in at least one dimension; and a weight scale coupled to a wireless communication module, wherein the weight scale is integrated into the top shelf of the packaging shelf arrangement.

Alternatively, or in addition to the other examples described herein, examples include any combination of the following:
- the frame is comprised of aluminum;
- a top shelf providing a flat surface;
- the shelf rack comprises at least three vertical shelf divisions disposed below the top shelf of the shelf rack;
- the first handle comprises two separate mirrored portions;
- the first handle is curved in at least two dimensions;
- a pair of secondary handles, each of the secondary handles disposed on one of the shared vertical members, wherein each of the secondary handles is curved in at least one dimension;
- at least one of the accessory support units comprises a printer holder;
- the first shipping container support unit comprises a pair of bag hooks;
- the first shipping container support unit is repositionable;
- the second shipping container support unit is disposed beneath the top shelf of the packaging shelf arrangement;
- the second shipping container support unit comprises two pairs of bag hooks;
- the second shipping container support unit is repositionable by sliding;
- the second shipping container support unit is configured to hold a plurality of shipping containers of a second size different than the first size;
- the second shipping container support unit is further configured to hold a plurality of shipping containers of a third size different than the first size and the second size;
- a weight scale coupled to a wireless communication module; and
- the weight scale is integrated into the top shelf of the packaging shelf arrangement.

The examples illustrated and described herein as well as examples not specifically described herein but within the scope of aspects of the disclosure constitute an exemplary entity-specific value optimization environment. The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A picking and packaging cart comprising:
   a frame;
   a shelf rack attached to the frame, the shelf rack comprising at least two pairs of vertical members, a shelf rack top shelf, and a plurality of shelf divisions;
   a first handle attached to the frame;
   at least two accessory support units attached to the shelf rack, the two accessory support units comprising at least two different configurations;
   a first shipping container support unit attached to the shelf rack, the first shipping container support unit configured to hold a plurality of shipping containers of a first size;
   at least four wheels attached to the frame, each of the at least four wheels disposed nearby a corner of the frame, wherein at least two wheels of the at least four wheels comprise swivel casters;
   a packaging shelf arrangement attached to the frame, the packaging shelf arrangement comprising at least two pairs of vertical members and a packaging shelf arrangement top shelf, wherein at least one pair of the vertical members of the packaging shelf arrangement are shared with the shelf rack, wherein the packaging shelf arrangement top shelf provides a first flat packaging surface, wherein the shelf rack top shelf is provided between the first handle and the packaging shelf arrangement top shelf, and wherein the shelf rack top shelf provides a second flat packaging surface further away from the at least four wheels than the packaging shelf arrangement top shelf; and
   a second shipping container support unit attached to the packaging shelf arrangement.

2. The cart of claim 1 wherein the frame is comprised of aluminum.

3. The cart of claim 1 wherein the plurality of shelf divisions comprises at least three vertical shelf divisions.

4. The cart of claim 3 wherein the at least three vertical shelf divisions are disposed below the shelf rack top shelf.

5. The cart of claim 1 wherein the first handle comprises two separate mirrored portions.

6. The cart of claim 1 wherein the first handle is curved in at least two dimensions.

7. The cart of claim 1 further comprising:
   a pair of secondary handles, each of the secondary handles disposed on one of the shared vertical members, wherein each of the secondary handles is curved in at least one dimension.

8. The cart of claim 1 wherein at least one of the accessory support units comprises a printer holder and another accessory support unit of the at least one of the accessory support units comprises a handheld scanner holder.

9. The cart of claim 1 wherein the first shipping container support unit comprises a pair of bag hooks.

10. The cart of claim 1 wherein the first shipping container support unit is repositionable laterally upon a support rail.

11. The cart of claim 1 wherein the second shipping container support unit is disposed beneath the packaging shelf arrangement top shelf.

12. The cart of claim 1 wherein the second shipping container support unit comprises two pairs of bag hooks.

13. The cart of claim 1 wherein the second shipping container support unit is repositionable by sliding.

14. The cart of claim 1 wherein the second shipping container support unit is configured to hold a plurality of shipping containers of a second size different than the first size.

15. The cart of claim 14 wherein the second shipping container support unit is further configured to hold a plurality of shipping containers of a third size different than the first size and the second size.

16. The cart of claim 1 further comprising:
   a weight scale coupled to a wireless communication module.

17. The cart of claim 16 wherein the weight scale is integrated into the packaging shelf arrangement top shelf.

18. A picking and packaging cart comprising:
   a frame comprised of aluminum;
   a shelf rack attached to the frame, the shelf rack comprising:
      at least two pairs of vertical members,
      a shelf rack top shelf providing a flat surface, and
      at least three vertical shelf divisions disposed below the shelf rack top shelf;
   a first handle attached to the frame, wherein the first handle comprises two separate mirrored portions, and wherein the first handle is curved in at least two dimensions;
   at least two accessory support units attached to the shelf rack, the two accessory support units comprising at least two different configurations, wherein at least one of the accessory support units comprises a printer holder;
   a first shipping container support unit attached to the shelf rack, the first shipping container support unit configured to hold a plurality of shipping containers of a first size, wherein the first shipping container support unit comprises a pair of bag hooks;
   at least four wheels attached to the frame, each of the at least four wheels disposed nearby a corner of the frame, wherein at least two wheels of the at least four wheels comprise swivel casters;
   a packaging shelf arrangement attached to the frame, the packaging shelf arrangement comprising at least two pairs of vertical members and a packaging shelf arrangement top shelf, wherein at least one pair of the vertical members of the packaging shelf arrangement are shared with the shelf rack, wherein the packaging shelf arrangement top shelf provides a first flat packaging surface, wherein the shelf rack top shelf is provided between the first handle and the packaging shelf arrangement top shelf, and wherein the shelf rack top shelf provides a second flat packaging surface further away from the at least four wheels than the packaging shelf arrangement top shelf;
   a second shipping container support unit attached to the packaging shelf arrangement, wherein the second shipping container support unit is disposed beneath the packaging shelf arrangement top shelf, wherein the second shipping container support unit is repositionable by sliding, wherein the second shipping container support unit comprises two pairs of bag hooks, and wherein the second shipping container support unit is configured to hold a plurality of shipping containers of a second size different than the first size; and a pair of secondary handles, each of the secondary handles disposed on one of the shared vertical members, wherein each of the secondary handles is curved in at least one dimension.

19. The cart of claim 18 further comprising:

a weight scale coupled to a wireless communication module, wherein the weight scale is integrated into the packaging shelf arrangement top shelf.

20. A picking and packaging cart comprising:

a frame comprised of aluminum;

a shelf rack attached to the frame, the shelf rack comprising:
   at least two pairs of vertical members,
   a shelf rack top shelf providing a flat surface, wherein the shelf rack top shelf is perforated, and
   at least three vertical shelf divisions disposed below the shelf rack top shelf;

a first handle attached to the frame, wherein the first handle comprises two separate mirrored portions, and wherein the first handle is curved in at least two dimensions;

at least two accessory support units attached to the shelf rack, the two accessory support units comprising at least two different configurations, wherein at least one of the accessory support units comprises a printer holder;

a first shipping container support unit attached to the shelf rack, the first shipping container support unit configured to hold a plurality of shipping containers of a first size, wherein the first shipping container support unit comprises a pair of bag hooks, and wherein the first shipping container support unit is repositionable;

at least four wheels attached to the frame, each of the at least four wheels disposed nearby a corner of the frame, wherein the at least four wheels comprise swivel casters, and wherein at least two of the swivel casters are lockable to prevent swiveling;

a packaging shelf arrangement attached to the frame, the packaging shelf arrangement comprising at least two pairs of vertical members and a packaging shelf arrangement top shelf, wherein at least one pair of the vertical members of the packaging shelf arrangement are shared with the shelf rack, wherein the packaging shelf arrangement top shelf provides a first flat packaging surface, wherein the shelf rack top shelf is provided between the first handle and the packaging shelf arrangement top shelf, and wherein the shelf rack top shelf provides a second flat packaging surface further away from the at least four wheels than the packaging shelf arrangement top shelf;

a second shipping container support unit attached to the packaging shelf arrangement, wherein the second shipping container support unit is disposed beneath the packaging shelf arrangement top shelf, wherein the second shipping container support unit is repositionable by sliding, wherein the second shipping container support unit comprises two pairs of bag hooks, wherein the second shipping container support unit is configured to hold a plurality of shipping containers of a second size different than the first size, wherein the second shipping container support unit is further configured to hold a plurality of shipping containers of a third size different than the first size and the second size;

a pair of secondary handles, each of the secondary handles disposed on one of the shared vertical members, wherein each of the secondary handles is curved in at least one dimension; and a weight scale coupled to a wireless communication module, wherein the weight scale is integrated into the packaging shelf arrangement top shelf.

* * * * *